(12) United States Patent
Kuo et al.

(10) Patent No.: US 10,886,778 B2
(45) Date of Patent: Jan. 5, 2021

(54) REMOTE MONITORING SYSTEM AND RELATED METHOD FOR SOLAR POWER GENERATION DEVICES

(71) Applicant: PAN-CO INTERNATIONAL CO., LTD., Taipei (TW)

(72) Inventors: Kun-Chang Kuo, Taipei (TW); Chun-Pin Lo, Taipei (TW); Min-Sheng Liao, Taipei (TW)

(73) Assignee: PAN-CO INTERNATIONAL CO., LTD., Taipei (TW)

( * ) Notice: Subject to any disclaimer, the term of this patent is extended or adjusted under 35 U.S.C. 154(b) by 428 days.

(21) Appl. No.: 15/946,010

(22) Filed: Apr. 5, 2018

(65) Prior Publication Data
US 2018/0342894 A1    Nov. 29, 2018

(30) Foreign Application Priority Data
May 26, 2017    (TW) .............................. 106117638 A

(51) Int. Cl.
| | |
|---|---|
| H02J 13/00 | (2006.01) |
| H04W 24/00 | (2009.01) |
| H02J 3/38 | (2006.01) |
| H04W 88/02 | (2009.01) |

(52) U.S. Cl.
CPC .............. *H02J 13/00* (2013.01); *H02J 3/383* (2013.01); *H02J 13/0079* (2013.01); *H04W 24/00* (2013.01); *H04W 88/02* (2013.01)

(58) Field of Classification Search
CPC .................................. H02J 13/00; H02J 3/383
USPC ........................................................... 702/62
See application file for complete search history.

(56) References Cited

U.S. PATENT DOCUMENTS

| | | | | |
|---|---|---|---|---|
| 10,516,295 | B2* | 12/2019 | Zhang ..................... | H02J 3/382 |
| 2011/0079266 | A1* | 4/2011 | Pan ......................... | F24S 50/20 |
| | | | | 136/246 |
| 2011/0173110 | A1* | 7/2011 | Tarbell ................... | G06Q 50/06 |
| | | | | 705/34 |
| 2012/0159596 | A1* | 6/2012 | Vandevelde ............ | H02S 20/32 |
| | | | | 726/7 |
| 2014/0018969 | A1* | 1/2014 | Forbes, Jr. .............. | H02J 3/386 |
| | | | | 700/295 |

(Continued)

FOREIGN PATENT DOCUMENTS

| | | |
|---|---|---|
| TW | I220592 B | 8/2004 |
| TW | I340309 B | 4/2011 |

(Continued)

*Primary Examiner* — Ricky Ngon
(74) *Attorney, Agent, or Firm* — Behmke Innovation Group LLC; James M. Behmke; Jonathon P. Western

(57) ABSTRACT

The present disclosure provides a remote monitoring system and related method for solar power generation device, including: transmitting electrical parameters and environmental parameters collected by a plurality of solar power generation devices to a computing device; and transmitting the electrical parameters and the ambient parameters by the computing device to a server through an embedded communication module disposed within the computing device, wherein the embedded communication module is an industrial-grade embedded 3G/4G communication module and can withstand temperatures of at least 70° C. Therefore, the remote monitoring system and related method according to the present disclosure can solve the problem of overheating of the equipment.

18 Claims, 2 Drawing Sheets

(56) References Cited

U.S. PATENT DOCUMENTS

| | | | | |
|---|---|---|---|---|
| 2014/0214220 | A1* | 7/2014 | Kamel | G06Q 10/06 |
| | | | | 700/291 |
| 2015/0001945 | A1* | 1/2015 | Estes | H02J 13/0075 |
| | | | | 307/66 |
| 2016/0308363 | A1* | 10/2016 | Nasuno | G01R 21/133 |
| 2017/0097615 | A1* | 4/2017 | Mazur | G05B 19/0423 |
| 2017/0338659 | A1* | 11/2017 | Bhowmik | H02J 3/383 |
| 2017/0347892 | A1* | 12/2017 | Yajima | A61B 5/6803 |
| 2019/0199131 | A1* | 6/2019 | Nakamura | H02J 3/38 |

FOREIGN PATENT DOCUMENTS

| | | |
|---|---|---|
| TW | 201637351 A | 10/2016 |
| TW | 201713954 A | 4/2017 |

\* cited by examiner

REMOTE MONITORING SYSTEM AND RELATED METHOD FOR SOLAR POWER GENERATION DEVICES

BACKGROUND

1. Technical Field

The present disclosure relates to remote monitoring systems and related methods, and, more particularly, to a remote monitoring system and related method for solar power generation devices.

2. Description of Related Art

Reducing environmental impact of global warming has always been the goal of governments around the world. One way is to seek a renewable energy program. Among the many renewable energy options, solar power is the most popular option.

Taiwan is a narrow island located in the tropical and subtropical regions. Sunshine is adequate and suitable for the development of solar power. In order to understand the relationship between the amount of sunshine and power generation, voltages and currents of the solar cells are often measured to further calculate the generated power. The measured voltage and current parameters are usually transmitted to a monitoring platform via wireless networks. In order to achieve maximum power generation efficiency, a number of solar power generation devices will be scattered in a number of sunny areas. However, network equipment often surfer from overheating in these sunny areas. Once equipment crashes, manual equipment restart is required on site. This substantially increases the time and money spent on maintenance. Similar remedial actions are required for device shut down caused by electricity tripping/power outage. Also, when different brands of solar power generation devices are used together, only monitoring software developed by its own company can be used, lacking integration and ease of use.

Therefore, there is a need for a solar power generation device that addresses the aforementioned issues in the prior art.

SUMMARY

In view of the aforementioned shortcomings of the prior art, the present disclosure provides a remote monitoring system for solar power generation devices, which may include: a plurality of solar power generation devices, each including a plurality of sensing units for collecting electrical parameters and ambient parameters surrounding the plurality of solar power generation devices; a computing device electrically connected with the plurality of solar power generation devices for receiving the electrical parameters and the ambient parameters, wherein the computing device is equipped with an embedded communication module; and a server connected with the computing device through the embedded communication module for receiving and storing the electrical parameters and the ambient parameters in a database of the server.

In addition, the present disclosure also provides a remote monitoring method for solar power generation devices, which may include the following steps of: broadcasting, by a computing device, packets to the plurality of solar power generation devices to determine brands of converters in the plurality of solar power generation devices; reading, by the computing device, profiles corresponding to the particular brands of the converters according to the brands of the converters determined, and issuing registration instructions to the plurality of solar power generation devices to register the plurality of solar power generation devices; receiving, by the computing device, electrical parameters and ambient parameters surrounding the plurality of registered solar power generation devices collected by a plurality of sensing units provided in the plurality of registered solar power generation devices; determining, by the computing device, validity of the electrical parameters and the ambient parameters, and converting them into text files in a fixed format; and transmitting, by the computing device, the text files to a database of a server for storage via an embedded communication module therein.

With the remote monitoring system and related method for solar power generation devices, the computing device is able to receive the electrical parameters and the ambient parameters of the plurality of solar power generation devices, which can then be transmitted to the database of the remote server via the embedded communication module installed in the computing device, wherein the embedded module can be an industrial-grade embedded 3G/4G communication module with temperature tolerance of at least 70° C. (preferably 85° C.) to prevent shut down due to overheating. In addition, the present disclosure is able to efficiently integrate solar power generation devices of various different brands in order to use them at the same time.

DETAILED DESCRIPTION OF THE EMBODIMENTS

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

Figure 1:
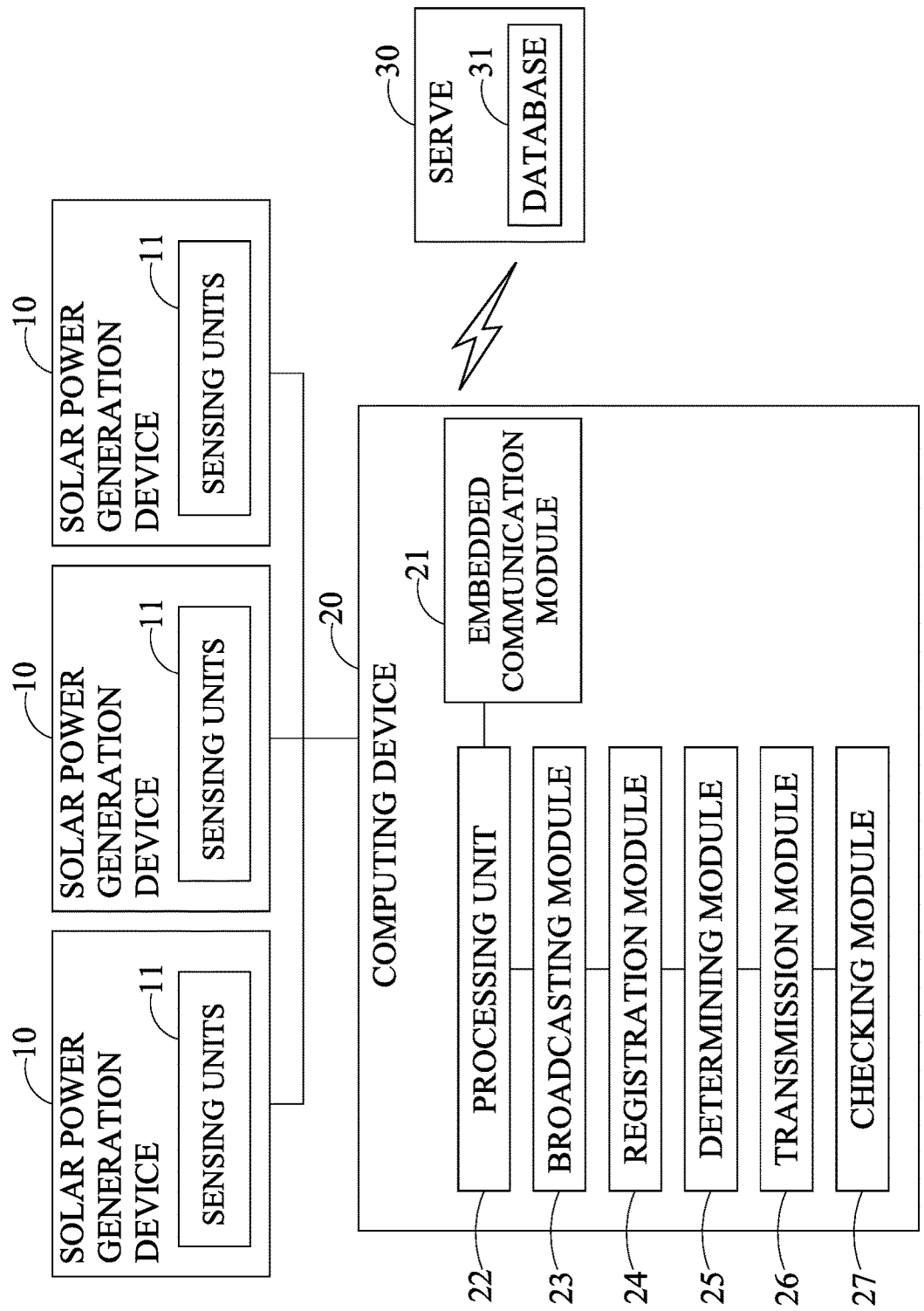
FIG. 1 is a schematic diagram of a remote monitoring system for solar power generation devices in accordance with the present disclosure.

Referring to FIG. 1, a remote monitoring system for a solar power generation device in accordance with the present disclosure includes a plurality of solar power generation devices 10, a computing device 20 and a server 30. Each of the solar power generation devices 10 includes a plurality of sensing units 11 for collecting electrical parameters of the solar power generation devices 10 and ambient parameters around the solar power generation devices 10.

In an embodiment, the solar power generation devices 10 can be photovoltaic inverters. Each of the solar power generation devices 10 can be connected to one or more solar power collecting devices, wherein the solar power collecting devices can be polycrystalline silicon solar cells, but the present disclosure is not limited to this. In another embodiment, the solar power collecting devices can also be monocrystalline silicon, amorphous silicon, copper indium gallium selenium or III-V compound semiconductor solar cells; however, the present disclosure is not limited to these.

In an embodiment, the plurality of sensing units 11 can be, but not limited to, voltage sensors, current sensors, temperature sensors, humidity sensors, rain gauges or wind direction meter/anemometer.

In an embodiment, the ambient parameters can be temperature, humidity, rainfall, wind direction, wind speed, air pressure or amount of sunshine. The electrical parameters are currents and voltages generated during power generation of the plurality of solar power generation devices 10, and are measured in unit of seconds. However, the present disclosure is not limited as such.

The computing device 20 is connected to the plurality of solar power generation devices 10 for receiving the electrical parameters and the ambient parameters. In an embodiment, the computing device 20 can be an industrial-grade computer such as a fanless embedded mainframe (model number MXE-200) manufactured by ADLINK Technology Inc., or an industrial-grade mainframe manufactured by AEWIN Technologies Co. that has temperature tolerance of 70° C. (or 85° C.). However, the present disclosure is not limited to these. In another embodiment, the computing device 20 is connected to the plurality of solar power generation devices 10 via a wired connection such as RS485 or Ethernet standard, but the present disclosure is not limited to these. In yet another embodiment, the computing device 20 receives the electrical and ambient parameters transmitted by the plurality of the solar power generation devices 10 via MODBUS communication protocol. However, the present disclosure does not limit the type of communication protocol that can be used.

The computing device 20 is provided with an embedded communication module 21 and a processing unit 22. The processing unit 22 can be a microprocessor, for example, and the embedded communication module 21 can be an industrial-grade embedded 3G/4G communication module, for example, a mini PCIe interface communication module manufactured by Intel/Telit, which can achieve temperature tolerance of at least 70° C., preferably 85° C. An antenna external to the computing device 20 is electrically connected to the embedded communication module 21. In an embodiment, a motherboard of the computing device 20 is provided with a SIM card slot for receiving a SIM card of a telecommunication company, which when used with the embedded communication module 21, allows the computing device 20 to be connected to the Internet.

The server 30 can be connected to the computing device 20 via the embedded communication module 21 and the antenna in the computing device 20 to receive and store the electrical and ambient parameters in a database 31 of the server 30.

In an embodiment, the computing device 20 further includes a broadcasting module 23, a registration module 24, a determining module 25, a transmission module 26 and a checking module 27. The computing device 20 can run on, for example, Windows 7 embedded operating system or other operating systems, but the present disclosure is not limited as such. The broadcasting module 23, the registration module 24, the determining module 25, the transmission module 26 and the checking module 27 can be implemented as software programs executed by the processing unit 22 and further run on the embedded operating system. The functions of the various modules are described below.

The broadcasting module 23 is used for broadcasting packets to the plurality of solar power generation devices 10. Once the packets are received, the plurality of solar power generation devices 10 will return packet acknowledgement so as to establish a connection with the computing device 20. Then, the broadcasting module 23 can determine the brands of the various converters in the plurality of solar power generation devices 10.

The registration module 24 then reads corresponding profiles of the various converter brands according to the brands of the converters in the plurality of solar power generation devices 10 determined by the broadcasting module 23, and then issues registration instructions to the plurality of solar power generation devices 10 according to the profiles in order to register the plurality of solar power generation devices 10.

Once the plurality of solar power generation devices 10 are registered, the determining module 25 receives the electrical parameters and ambient parameters collected by the plurality of registered solar power generation devices 10. The determining module 25 can also determine the validity of the electrical parameters and the ambient parameters, for example, by checking the validity of CRC or checksum data. If data is valid, then the determining module 25 converts the electrical parameters and the ambient parameters into text files in a fixed format. The reason for converting the parameters into text files is to reduce network traffic and for the convenience of subsequent processes. The determining module 25 of the present disclosure can also convert the electrical parameters and the ambient parameters into files of other formats (e.g., .doc files), and the present disclosure is not limited as such.

The transmission module 26 can transmit the text files to the remote server 30 via the embedded communication module 21 and the antenna. The server 30 receives and stores the text files in the database 31. The database can be written in SQL, Access, Oracle, and the present disclosure does not limit the type of database language is used.

The checking module 27 determines if the transmission module 26 has finished transmission. If the transmission module 26 has completed the transmission, the checking module 27 instructs the broadcasting module 23 to start broadcasting again and checks if there is any solar power generation device 10 that is not registered (e.g., a newly setup solar power generation device or a solar power generation device that has just finished initiation etc.). If there is unregistered solar power generation device 10, the broadcasting module 23, the registration module 24, the determining module 25 and the transmission module 26 will perform the above operations again in order for a newly registered solar power generation device 10 to transmit the electrical parameters and the ambient parameters to the server 30.

Figure 2:
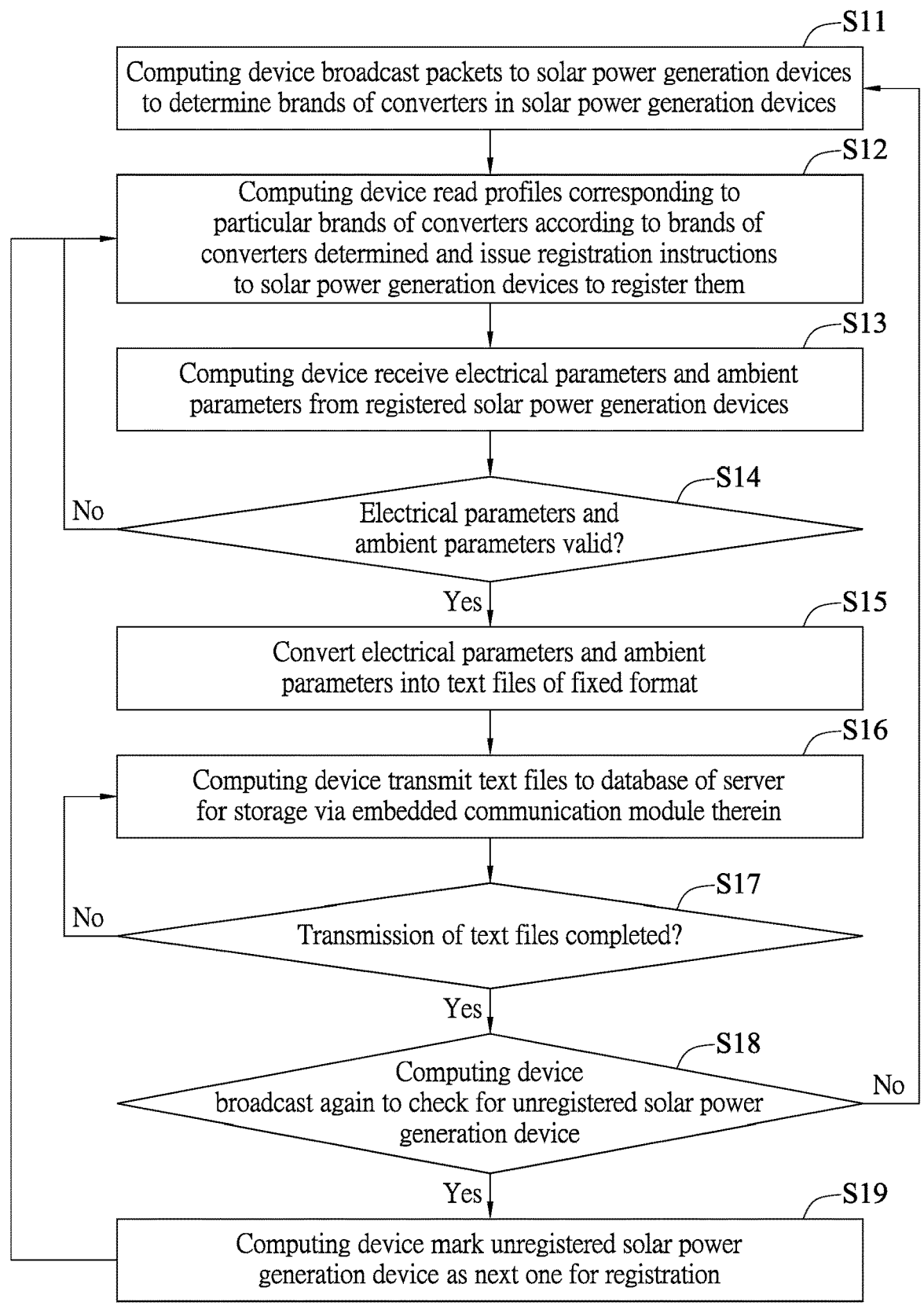
FIG. 2 is a flowchart illustrating a remote monitoring method for solar power generation devices in accordance with the present disclosure.

Referring to FIG. 2, a remote monitoring method for a solar power generation device in accordance with the present disclosure is shown, which may include at least steps S11 to S19. The remote monitoring method for a solar power generation device according to the present disclosure can be run on the abovementioned remote monitoring system. The remote monitoring method for a solar power generation device is further explained in details below, features that are similar to those described before are omitted to avoid repetition.

In step S11, packets are broadcasted by a computing device to a plurality of solar power generation devices. Upon receiving the packets, a packet acknowledgement is returned by the plurality of solar power generation devices in order to establish connections with the computing device. Upon establishing the connections, brands of converters in the plurality of solar power generation devices are determined by the computing device. Then, the method proceeds to step S12.

In step S12, profiles corresponding to the particular brands of the converters are read by the computing device according to the brands of the converters determined by the computing device, and registration instructions are issued by the computing device to the plurality of solar power generation devices based on contents of the profiles in order to register the plurality of solar power generation devices. Then, the method proceeds to step S13.

In step S13, electrical parameters and ambient parameters are received by the computing device from the plurality of registered solar power generation devices. The electrical parameters and the ambient parameters are collected by a plurality of sensors provided in the plurality of solar power generation devices. Then, the method proceeds to step S14.

In step S14, the validity of the electrical parameters and the ambient parameters is determined by the computing device. In other words, the CRC or checksum data of the electrical parameters and the ambient parameters are checked by the computing device to ensure the validity of the data. If a data is valid, the method proceeds to step S15; else, the method returns to step S12 to restart the registration process of the solar power generation devices and receive electrical parameters and ambient parameters again.

In step S15, the electrical parameters and the ambient parameters are converted to text files in a fixed format by the computing device. The reason for converting the parameters into text files is to reduce network traffic and for the convenience of subsequent processes. The present disclosure can also convert the electrical parameters and the ambient parameters into files of other formats (e.g., .doc files), and the present disclosure is not limited as such. Then, the method proceeds to step S16.

In step S16, the text files are transmitted by the computing device to a database of a server for storage via an embedded communication module and an antenna The database can be written in SQL, Access, Oracle, and the present disclosure does not limit the type of database language is used.

Once the text files have been stored in the database of the server, it is determined if the text files are transmitted completely (step S17). If not, the method returns to step S16 to transmit the text files again; else, the method proceeds to step S18.

In step S18, broadcasting is performed again by the computing device check for any solar power generation device that is not registered. If not, the method returns to step S11. If so, an unregistered solar power generation device is marked as the next one for registration (step S19) and the method returns to step S12 to perform registration, transmission of electrical and ambient parameters, and other steps. For example, the profile of the brand of a converter in an unregistered solar power generation devices is first read and a registration instruction is issued to the unregistered solar power generation devices in order for the solar power generation devices to register. Then, the electrical parameters and the ambient parameters of the newly registered solar power generation device can be received, the validity of the electrical and the ambient parameters can be determined, and the parameters converted to text files in a fixed format before transmitting to the database of the server for storage.

In an embodiment, the computing device and the solar power generation devices according to the present disclosure can be equipped with a means for rebooting automatically upon powering up (e.g., without an on/off circuit) to avoid the problem of having to manually switched on after electricity tripping/power shortage.

With the remote monitoring system and related method for solar power generation devices, the computing device may receive the electrical parameters and the ambient parameters of the plurality of solar power generation devices, which can then be transmitted to the database of the remote server via the embedded communication module installed in the computing device, wherein the embedded module can be an industrial-grade embedded 3G/4G communication module with temperature tolerance of at least 70° C. (preferably 85° C.) to prevent shut down due to overheating. In addition, the computing device of the present disclosure is able to determine the brands of converters in the plurality of solar power generation devices in order to perform registration. This allows solar power generation devices of different brands to be used together, and any unregistered solar power generation device (e.g., a newly setup solar power generation device or a solar power generation devices that has just finished initialization) can be checked to make sure the electrical parameters and the ambient parameters collected by the solar power generation device can be received correctly.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A remote monitoring system, comprising:
a plurality of solar power generation devices, each including a plurality of sensing units configured for collecting electrical parameters and ambient parameters surrounding the plurality of solar power generation devices;
a computing device electrically connected with the plurality of solar power generation devices and configured for receiving the electrical parameters and the ambient parameters, wherein the computing device is equipped with an embedded communication module; and
a server connected with the computing device through the embedded communication module and configured for receiving and storing the electrical parameters and the ambient parameters in a database of the server,
wherein the computing device includes:
a broadcasting module executed by a processing unit of the computing device and configured for broadcasting packets to the plurality of solar power generation devices to determine brands of converters in the plurality of solar power generation devices;
a registration module executed by the processing unit and configured for reading profiles corresponding to the brands of the converters according to the brands of the converters determined by the broadcasting module, and issuing registration instructions to the plurality of solar power generation devices to register the plurality of solar power generation devices;
a determining module executed by the processing unit and configured for receiving the electrical parameters and the ambient parameters collected by the plurality of solar power generation devices, determining validity of the electrical parameters and the ambient parameters, and converting the electrical parameters and the ambient parameters to text files in a fixed format;

a transmission module executed by the processing unit and configured for transmitting the text files to the database of the server via the embedded communication module; and a checking module executed by the processing unit and configured for determining if the text files are transmitted completely and instructing the broadcasting module to start broadcasting again upon completion of the transmission to check for any unregistered solar power generation device.

2. The remote monitoring system of claim 1, wherein the embedded communication module is an industrial-grade embedded 3G/4G communication module.

3. The remote monitoring system of claim 2, wherein the embedded communication module is a mini PCIe interface.

4. The remote monitoring system of claim 2, wherein the embedded communication module has temperature tolerance of at least 70° C.

5. The remote monitoring system of claim 1, wherein the computing device is connected with the plurality of solar power generation devices via RS485 or Ethernet standard.

6. The remote monitoring system of claim 5, wherein the computing device is configured for receiving the electrical parameters and the ambient parameters transmitted by the plurality of solar power generation devices using MODBUS communication protocol.

7. The remote monitoring system of claim 1, wherein the plurality of sensing units include at least one selected from the group consisting of a voltage sensor, a current sensor, a temperature sensor, a humidity sensor, a rain gauge, and a wind direction meter and anemometer.

8. The remote monitoring system of claim 1, wherein the ambient parameters include at least one selected from the group consisting of temperature, humidity, rainfall, wind direction, wind speed, air pressure and amount of sunshine, and the electrical parameters are currents and voltages generated during power generation of the plurality of solar power generation devices.

9. The remote monitoring system of claim 1, wherein the plurality of solar power generation devices are photovoltaic inverters, and each of the plurality of solar power generation devices is connected to one or more solar power collecting devices, and wherein the solar power collecting devices are polycrystalline silicon solar cells.

10. A remote monitoring method for solar power generation devices, comprising:

broadcasting packets to the plurality of solar power generation devices to determine brands of converters in the plurality of solar power generation devices using a broadcasting module executed by a processing unit of a computing device;

reading profiles corresponding to the corresponding brands of the converters according to the brands of the converters determined by the broadcasting module and issuing registration instructions to the plurality of solar power generation devices to register the plurality of solar power generation devices using a registration module executed by the processing unit of the computing device;

receiving electrical parameters and ambient parameters surrounding the plurality of registered solar power generation devices collected by a plurality of sensing units provided in the plurality of registered solar power generation devices using a determining module executed by the processing unit of the computing device;

determining validity of the electrical parameters and the ambient parameters and converting the electrical parameters and the ambient parameters into text files in a fixed format using the determining module executed by the processing unit of the computing device;

transmitting the text files to a database of a server for storage via an embedded communication module in the computing device using a transmission module executed by the processing unit of the computing device;

determining if the text files are transmitted completely using a checking module executed by the processing unit of the computing device;

broadcasting again to check for any unregistered solar power generation device using the broadcasting module executed by the processing unit of the computing device; and when an unregistered solar power generation device is found:
reading a profile of the brands of converters in the unregistered solar power generation device to issue a registration instruction thereto using the registration module, and
receiving the electrical parameters and the ambient parameters collected therefrom using the determining module.

11. The remote monitoring method of claim 10, wherein the embedded communication module is an industrial-grade embedded 3G/4G communication module.

12. The remote monitoring method of claim 11, wherein the embedded communication module is a mini PCIe interface.

13. The remote monitoring method of claim 11, wherein the embedded communication module has temperature tolerance of at least 70° C.

14. The remote monitoring method of claim 10, wherein the computing device is connected with the plurality of solar power generation devices via RS485 or Ethernet standard.

15. The remote monitoring method of claim 14, wherein the computing device receives the electrical parameters and the ambient parameters transmitted by the plurality of solar power generation devices using MODBUS communication protocol.

16. The remote monitoring method of claim 10, wherein the plurality of sensing units include at least one selected from the group consisting of a voltage sensor, a current sensor, a temperature sensor, a humidity sensor, a rain gauge, and a wind direction meter and anemometer.

17. The remote monitoring method of claim 10, wherein the ambient parameters include at least one selected from the group consisting of temperature, humidity, rainfall, wind direction, wind speed, air pressure and amount of sunshine, and the electrical parameters are currents and voltages generated during power generation of the plurality of solar power generation devices.

18. The remote monitoring method of claim 10, wherein the plurality of solar power generation devices are photovoltaic inverters, and each of the plurality of solar power generation devices is connected to one or more solar power collecting devices, and wherein the solar power collecting devices are polycrystalline silicon solar cells.

* * * * *